Sept. 27, 1932.   E. D. TILLYER ET AL   1,880,028
EYE TESTING DEVICE
Filed Nov. 30, 1928   3 Sheets-Sheet 3
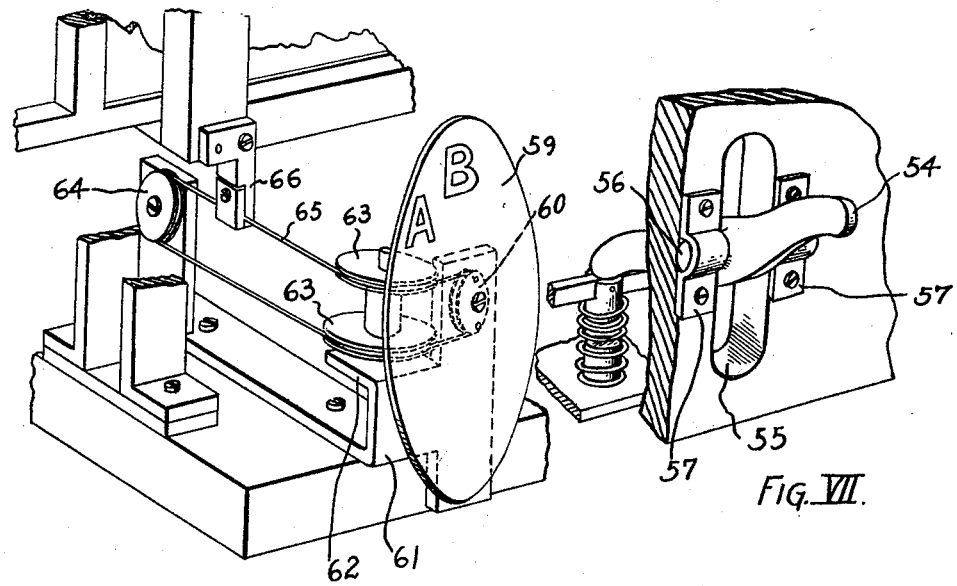
Fig. VI.   Fig. VII.
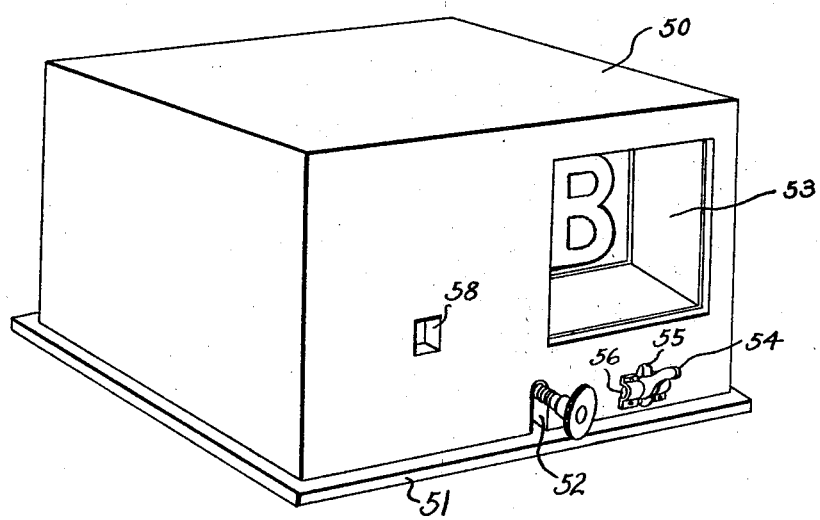
Fig. VIII.
Inventors
EDGAR. D. TILLYER
NELSON. M. BAKER
By Harry H. Styll
Attorney Patented Sept. 27, 1932

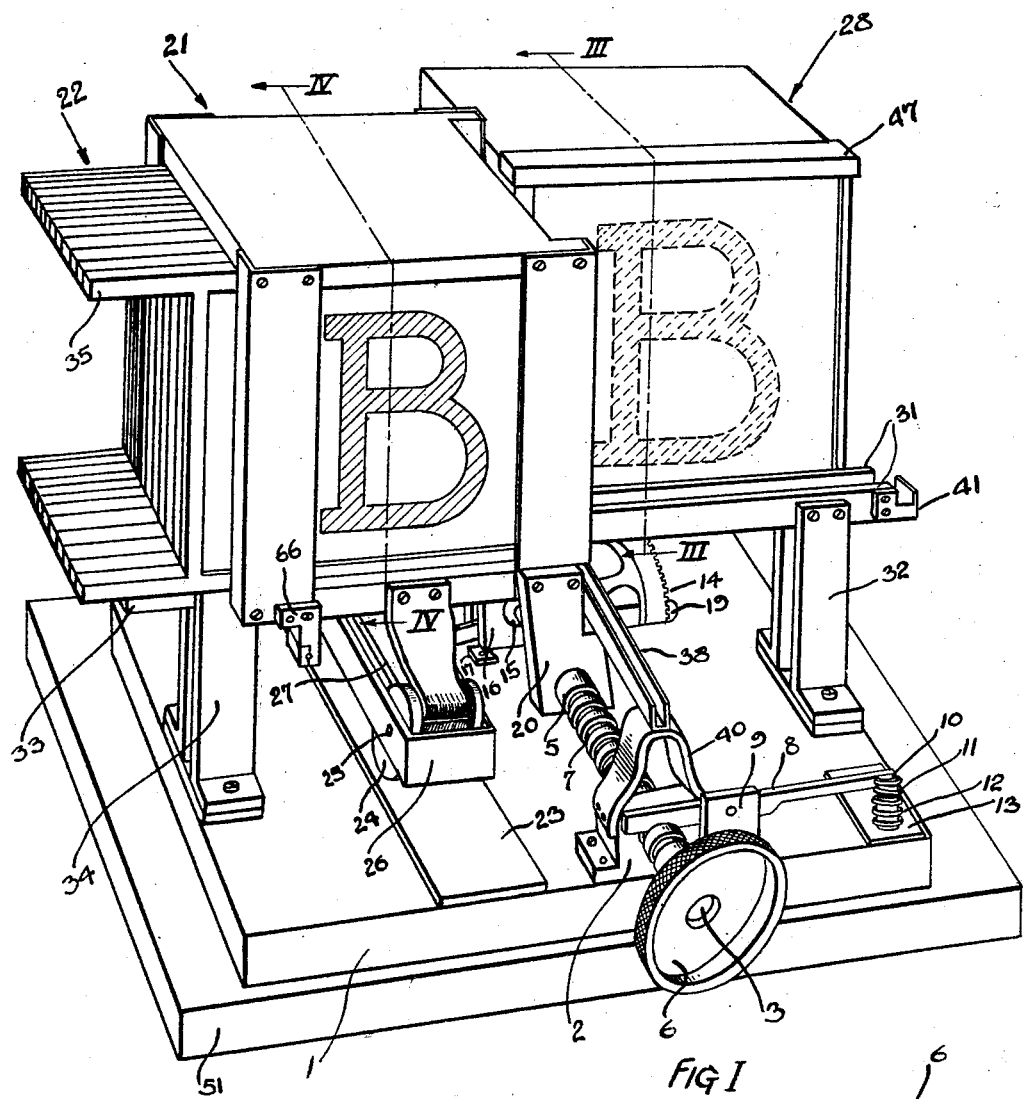
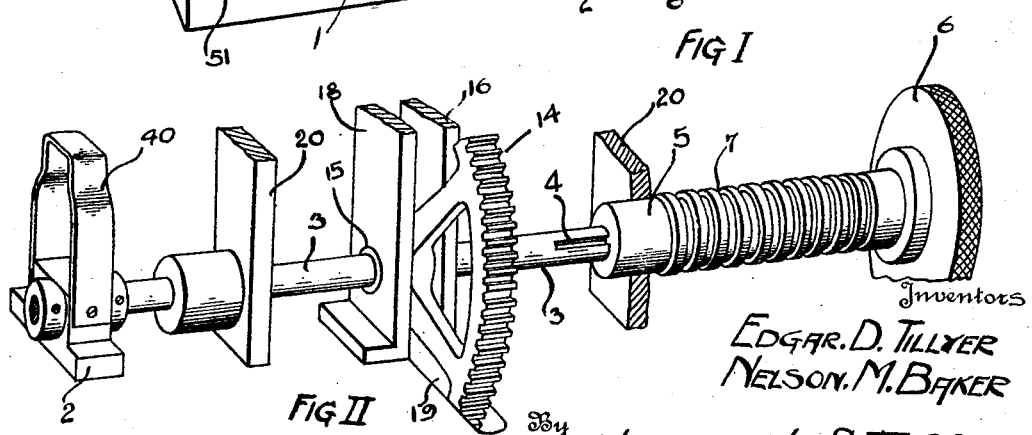

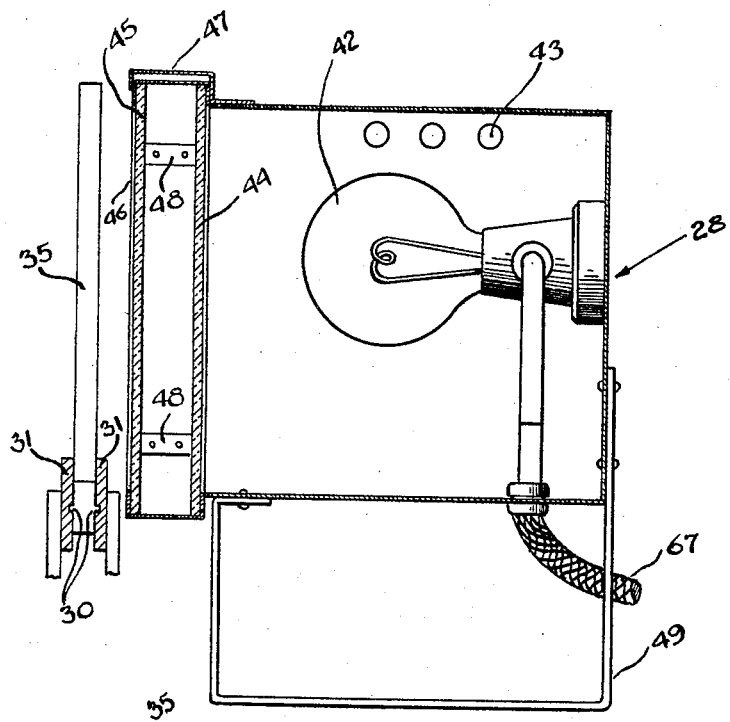
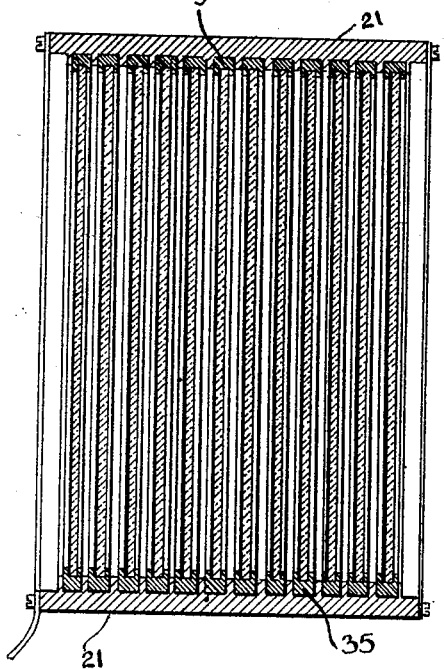
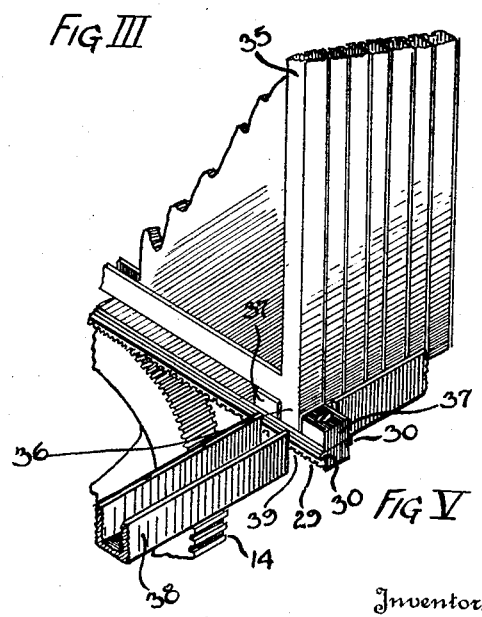

1,880,028

UNITED STATES PATENT OFFICE

EDGAR D. TILLYER AND NELSON M. BAKER, OF SOUTHBRIDGE, MASSACHUSETTS, ASSIGNORS TO AMERICAN OPTICAL COMPANY, OF SOUTHBRIDGE, MASSACHUSETTS, A VOLUNTARY ASSOCIATION OF MASSACHUSETTS

EYE TESTING DEVICE

Application filed November 30, 1928. Serial No. 322,857.

This invention relates to eye testing devices and has particular reference to improved means for testing visual acuity.

An important object of the invention is to provide a constant test position in a device of this nature.

Another object is to provide a background of illumination of one intensity for all test objects.

Another object is to provide means whereby all test objects may be viewed from a similar visual angle.

Another object is to provide a definite testing position.

Another object is to provide an enclosed mechanism for carrying out the test whilst allowing manipulation of the mechanism from the exterior.

Another object is to provide means whereby any desired test object may be selected for exposure quickly and accurately.

Another object is to provide incidental means to indicate the individual object before it is exposed.

Other objects and advantages of the invention will become apparent from the following description taken in connection with the accompanying drawings, and it will be apparent that many changes may be made in the details of construction and arrangement of parts without departing from the spirit of the invention as expressed in the accompanying claims. We, therefore, do not wish to be limited to the exact details of construction and arrangements shown and described as the preferred forms have been shown by way of illustration only.

Fig. I is a perspective view of the device with the cover and indicator removed;

Fig. II is a fragmentary diagrammatic view in perspective of the reciprocating mechanism;

Fig. III is a section on line III—III of Fig. I;

Fig. IV is a section on line IV—IV of Fig. I;

Fig. V is a fragmentary diagrammatic view in perspective of the rack mechanism;

Fig. VI is a fragmentary diagrammatic view in perspective of the indicating mechanism;

Fig. VII is a fragmentary diagrammatic view in perspective of the rocker mechanism;

Fig. VIII is a perspective view of the complete device.

In the construction of eye-testing cabinets many objectionable features have been apparent and it is our intention to provide a cabinet which will overcome these objectionable features which detracted from the accuracy of the tests to a serious degree. One type of prior art test cabinet had a single chart covered with various test objects which meant that the patient had to be continually moving his eyes from one object to another. The tests were, therefore, carried out with the eyes at different angles for each object and so a variation would be impossible to avoid, depending upon the acuity of the patient's eyes at various angles. This drawback has been eliminated in our invention and one angle is maintained for all tests.

The illumination of the prior art cabinets was also faulty as the charts were usually brilliantly lighted at the center whilst being only faintly illuminated at the sides and edges. This meant that poor illumination was often mistaken for poor visual acuity and the accuracy of the tests much impaired. In our invention we have applied a novel lighting system which adds to the accuracy of the test instead of detracting from it.

Another of these very objectionable features was the fact that where a series of test objects were used with each test object upon a separate plate, the series would be arranged so that each object appeared at a different distance from the patient's eye. As it is well known that visual acuity varies with the distance of the object from the eye, the tests were comparatively worthless.

In our invention the series are arranged so that each object appears at an equal distance from the eye and this in itself is one of the prime objects of our invention. Other improvements have been incorporated into the invention and it will be apparent that the novel features have been carried out in a simple, economical and efficient manner well calculated to form a great advance in the art and allowing eyes to be tested very accurately for visual acuity.

Referring to the drawings wherein similar reference characters denote corresponding parts throughout, the numeral 1 designates a base member which is preferably made from a substantial wooden board to carry the mechanism secured thereto. This mechanism, broadly, consists of a light chamber 28 and test object cage 21 with reciprocating means to align the cage 21 and the individual test objects 22 with the light chamber 28. The reciprocating means consists preferably of a central shaft 3 supported on a pair of bearing blocks 2 centrally disposed on the base 1. The shaft 3 is secured in the rear block 2 where it is free to turn but not to move longitudinally. A keyway 4 (Fig. II) is cut in the front end of the shaft 3 and a tubular member 5 keyed thereon. This forms a preferred means of selectively operating the reciprocating mechanism. The first bearing block 2 supports the tube 5 and allows free rotation and also longitudinal movement therein. It will be apparent that the tube 5 can slide on the shaft 3, over the key-joint, but when a turning movement is applied both tube and shaft are locked and will turn together.

A hand wheel 6 is fixedly attached to the tube 5 and forms a convenient means of operating the reciprocating mechanism. A series of circular grooves 7 is formed around the outer surface of the tube 5 and locatable in any desired one of these grooves is a spring-operated lever 8. This lever 8 is preferably pivoted at the support 9 and is attached to a plunger 10 carrying a spring 11. Supporting the spring 11 at the lower end is a plug 12 which is fixedly attached to a plate 13 secured to the base 1. Pressure upon the spring end of the lever 8 will react through the pivot 9 and cause the lever to lift from the groove 7 in the tube 5 and the reciprocating mechanism can be operated longitudinally. When the lever 8 is in position in a groove 7 the mechanism can be operated for rotary but not longitudinal movement. To convey the rotary motion applied manually to the hand wheel 6 there is a toothed wheel 14 centrally disposed on the shaft 3. This wheel is fixedly attached to the shaft 3 and preferably has a boss 15 which slidably locates in a plate 16 and is supported thereby. The plate 16 has supporting feet 17 which can be attached to the base 1. A second support plate 18 is attached in a similar manner to the other side of the wheel 14 and lends additional support to this important member. To allow clearance for the wheel, since the height of the apparatus is kept as low as possible, there is a slot 19 cut in the base 1 so that part of the wheel 14 is always hidden in the base.

Two travelling supports 20 are also mounted on the shaft 3, one in direct contact with the shaft and free to slide thereon and the other fixedly attached to the tube 5. These supports are adapted to travel backwards and forwards across the base 1 when the tube 5 and handle 6 are operated in that manner. Mounted upon these supports 20 at the upper end is a cage 21 containing my test object charts 22. In order to allow for movement of the cage 21 with the reciprocating motion of the tube 5 there is a runway 23 fixed to the base 1. This runway preferably consists of a strip of metallic material and is of sufficient width to accommodate two pairs of rollers 24. In Fig. I the front rollers only are shown but a similar pair is fixed to the rear end of the cage 21 and give support to that and in a similar manner to the front pair. The rollers then are mounted on an axle 25 and the two pairs are connected by a connecting strip 26 which is fixed to the axle 25 and passes around the front of the rollers. The rollers, however, can revolve independently of the connecting strip which remains at all times in the position shown in Fig. I. Resting on the axles 25 is a support plate 27 which being attached to the cage 21 at front and rear ends serves to hold it in contact with the rollers and to be moved longitudinally by the rotation of the axles 25.

Placed side by side with the test object cage 21 is our lamp chamber 28 before which the test object charts 22 are adapted to be moved independently. A rack 29, Fig. V, meshes with the toothed wheel 14 and is adapted to move in the direction of movement of said wheel. The said rack 29 is provided with spaced members 37 adjacent one end thereof which intersect and form a portion of the slideway 38 intermediate its ends at a point at which the transverse guides 31 are located and also provides means between which the extension 36 on the frame 35 of the chosen chart 22 extends as is shown in Fig. V, which means causes the chart to move longitudinally of the guides 31 and into alignment with the illuminated chamber 28 when the rack 29 is moved through the rotation of the toothed wheel 14 by means of the hand wheel 6. Any desired chart 22 may be selected from the group of charts by movement of the projection 36 thereon longitudinally of the slide 38 and into position between the spaced members 37. The rack 29 has a key portion 30 at each side which locates in the guides 31 (see Fig. III) in front of the lamp chamber. A stop 41 prevents the rack 29 from moving too far. The guides 31 are supported at one end by the plates 16 and 18 and at the other by supports 32 and aligned with these guides, but in front of the test object cage 21, is another pair of guides 33. This enables the rack 29 to be slid from one pair of guides to the other and carry any test object chart with it. The second pair of guides 33 are also supported by the plates 16 and 18 and an end support 34.

The charts 22 are preferably composed of a sheet of glass or other suitable transparent material bearing the desired test insignia. This is enclosed in a binding frame 35 having an extension 36 at one end which locates in a space between two blocks 37 on the rack 29 (see Fig. V). It will be apparent that the test charts can be moved into and out of line with the light chamber and also reciprocated across the base upon the runway 23. The charts shown in Fig. I are twelve in number but any number may be used, depending upon the accommodation of the cage. When twelve charts are used a similar number of grooves 7 are cut upon the tube 5 and the lever 8 will drop into a desired groove depending upon the extent to which the tube is moved upon the shaft 3.

The extension 36 upon the charts 22 also locates in guides 38 when the table 5 is moved upon the shaft 3. A space 39 (Fig. V) is left between the guides to enable the charts to move across the light chamber 28. The guides 38 are supported by the brackets 40 attached to the bearing blocks 2 and also by the plates 16 and 18 at the center. The light chamber 28 is of novel construction and is responsible for the efficient way in which the test charts are illuminated so as to supply a background of illumination of one intensity. The construction is shown in Fig. III where it will be apparent that an economical method has been adopted to carry out the objects of the device. The lamp 42 which is preferably calibrated, is enclosed in a chamber consisting preferably of a sheet metal box painted on the inside with a white paint. A series of holes 43 can be drilled on either side for heat-expelling purposes. Facing the lamp is a removable slide 44 of translucent white colored glass or other suitable translucent material which forms the fourth side of the chamber. An extension chamber is built upon the light chamber 28 consisting of another removable slide 45 of translucent white glass inserted into a frame 46 which is attached to the main light chamber by soldering or other suitable means. A cap member 47 whitened on the inside fits over the two translucent slides and retains the slides in position. Separators 48 are employed between the slides and a support member 49 is used to affix the whole assembly to the base 1.

It will be apparent that the whole interior of the chamber 28 will present a light diffusing surface to the lamp 42 and that diffused light will be emitted through the slide 44. This light will enter the extension chamber and be again diffused by the second slide 46. This is disclosed more fully in the operation of the device. In order that the apparatus may present a neat and workmanlike appearance we have provided a cover 50 which is illustrated in Fig. VIII. This cover fits over the entire assembly and rests upon a sub-base member 51 which is attached to the base 1. A slot 52 is cut in the side in order that the tube 5 may pass through easily when operated by the hand wheel 6. The charts 22 when slid across the face of the light chamber 28 will appear before an aperture or sight opening 53 provided for this purpose in the side of the cover. This sight opening 53 is provided with a box-like enclosure which extends rearwardly to the light chamber. It is preferably made of sheet metal painted black and serves to contrast with and throw into relief the whitely luminous charts. The spring operated lever 8 is made accessible by means of a slot 55 in the cover 50 through which extends a rocker 54. The rocker is pivoted upon a shaft 56 (see Fig. VII) which is supported by clamps 57 attached to the exterior of the cover. By manually operating the rocker 54 the lever 8 can be lifted from a groove 7 in the tube 5 and the chart cage 21 reciprocated in either direction.

A fourth aperture 58 is cut in the side of the cover and behind this is placed a dial 59 (see Fig. VI) which bears upon its surface a replica of the test objects upon the charts 22. The dial is adapted to be rotated behind the aperture 58 and synchronized so that when a certain test chart 22 is reciprocated into line with the guides 31 and before it is slid into position before the light chamber by rotary movement of the hand wheel 6 the replica of the object will appear behind the aperture 58. A roller 60 is fixedly attached to the dial 59 and revolubly mounted upon a support 61 which is attached to the base 1. A pair of rollers 63 are mounted one above the other upon a flange 62 on the support 61. A third roller 64 is adapted to revolve at the other end of the support 61 in line with the pair of rollers 63. A cord 65 of cat gut or other suitable material is the connecting link between the above rollers and motion to the cord is imparted by attaching it to a clip 66 which is fixed to the cage 21. It will be seen that motion forwardly or rearwardly of the cage will move the cord also causing the dial to rotate and bring into line with the aperture successively the replica of each test object.

In the operation of the device the lamp is illuminated from any convenient source by means of the connection 67. Light from the lamp will be transmitted to the walls of the lamp chamber and diffused therefrom. The light reaching the translucent glass slide will be diffused and enter the extension chamber where it will again be diffused by the second slide.

A negligible amount of direct light will be transmitted through the slide and uniform illumination will result. The test object will be exposed before a background of clear diffused light which will enable the patient to be tested under ideal conditions as regards visual acuity and to prevent fatigue resulting from exposure of the eye to harsh and brilliant illumination. It is well known that visual acuity varies with the degree of light so that a test carried out with poor illumination will give different results to one carried out with an illumination having the efficiency of the type herein described.

The rocker is next operated to depress the lever which locks the reciprocating mechanism. The hand wheel is pushed to align with the light chamber the chart it is desired to slide before it. The indicator will denote the desired position longitudinally of the chart and the lever can be released to fall into the related groove. The hand wheel is now rotated to slide the chart into position before the illuminated slide. Each chart can be selected in this manner and any one can be instantly chosen by merely pushing or pulling out the handle while the lever is raised. Each chart after exposure must be returned to the cage before another can be exposed, as the guides will not accommodate more than one. This feature prevents the charts becoming displaced and possibly broken. The ease of manipulation of the device is one of the features which add to its efficiency. From the exterior of the cover there are but two handles protruding, and a neat and pleasing appearance is thus given to the apparatus.

The test charts are all exposed at a uniform distance from the observer and at one orifice. This feature allows each chart to be viewed from the same visual angle and the observer does not have to move in order to accomplish this. The visual acuity of two or more people may be compared for a specified distance and the results are free from error.

From the foregoing it will be seen that we have provided a simple, efficient and novel means for carrying out the objects of the invention, especially providing a constant test position and one intensity of illumination.

Having described our invention, we claim:

1. In a device of the character described, an illuminated chamber having an observation opening therein, a chart holder, a plurality of charts in the holder, having test objects thereon mounted adjacent the light chamber, and adapted to be illuminated in said chamber, and a push rod member attached to the chart holder and being movable therewith in a direction substantially normal to the front plane of the light chamber to position the desired chart in a definite relation to said front plane without displacing any of the charts from the holder, and having rotatable inter-engaging means thereon engaging with the desired chart and moving said chart into and out of alignment with the observation opening when the push rod is rotated.

2. In a device of the character described, an illuminated chamber, a plurality of test charts movably mounted adjacent the illuminated chamber and means associated with the said plurality of charts and being movable therewith towards and away from the front plane of the illuminating chamber to position a desired chart of said plurality of charts in alignment with the chamber and having inter-engaging means thereon engaging with the desired chart in said aligned position and being operable in a transverse direction to move the said desired chart into and out of alignment with the illuminated chamber.

3. In a device of the character described, an illuminated chamber, a plurality of test charts movably mounted adjacent the illuminated chamber and means movable with said charts for moving them as a unit towards and away from the front plane of the chamber to position a chart in alignment with said chamber and having inter-engaging means thereon engaging with the desired chart in said aligned position and being operable in a transverse direction to move said desired chart into and out of the illuminated chamber, said movements towards and away from the front plane of the light chamber and in a direction transversely thereto being made successively and independently of each other by said chart moving means.

4. In a device of the character described, an illuminated chamber, a plurality of test charts movably mounted adjacent the illuminated chamber, single operable means associated with said plurality of charts and being movable therewith towards and away from the front plane of the illuminated chamber to position a desired chart of said plurality of charts in alignment with the chamber and having inter-engaging means thereon engaging with the desired chart in said aligned position and being operable in a transverse direction to move the said desired chart into and out of alignment with the illuminated chamber and means associated with said movable chart members and being operable thereby for determining which chart is in alignment with the light chamber.

5. In a device of the character described, an illuminated chamber having an observation opening therein and a slide-way adjacent said opening, a chart holder adjacent the light chamber, a plurality of displaceable chart members in said chart holder, said chart holder having roller members thereunder and being movable on said roller members in a direction substantially normal to the front plane of the light chamber to a position wherein the desired chart is aligned with the slide-way, and rack and pinion means for moving said chart longitudinally of the slideway into and out of alignment with the observation opening.

6. In a device of the character described, an illuminated chamber having an observation opening therein and a slide-way adjacent said opening, a chart holder adjacent the light chamber, a plurality of displaceable chart members in said chart holder having inter-engaging means thereon, said charts being movable as a unit in a direction substantially normal to the front plane of the light chamber to position a desired chart in alignment with the slide-way and an operable slide rod member having inter-engaging means thereon engaging with the inter-engaging means on the desired chart and adapted to move said chart longitudinally of the slide-way into and out of alignment with the observation opening.

EDGAR D. TILLYER.
NELSON M. BAKER.